United States Patent
Orain

[11] 4,010,625
[45] Mar. 8, 1977

[54] SLIDING HOMOKINETIC JOINT

[75] Inventor: Michel Orain, Conflans Sainte Honorine, France

[73] Assignee: Glaenzer Spicer, Poissy, France

[22] Filed: Sept. 11, 1975

[21] Appl. No.: 612,566

[30] Foreign Application Priority Data

Sept. 27, 1974 France .............................. 74.32689

[52] U.S. Cl. .......................................... 64/21; 64/8
[51] Int. Cl.² .......................................... F16D 3/30
[58] Field of Search .............................. 64/21, 8, 7

[56] References Cited
UNITED STATES PATENTS

| | | | |
|---|---|---|---|
| 3,318,108 | 5/1967 | Cadiou | 64/8 |
| 3,381,497 | 5/1968 | Allen | 64/21 |
| 3,609,994 | 10/1971 | Colletti et al. | 64/8 |
| 3,643,468 | 2/1972 | Kleinschmidt | 64/8 |

*Primary Examiner*—Samuel Scott
*Assistant Examiner*—Randall Heald
*Attorney, Agent, or Firm*—Wenderoth, Lind & Ponack

[57] ABSTRACT

The invention substantially increases the maximum break angle of the joint without increasing its overall size. This is achieved in taking advantage of the planetary movement of the shaft carrying the tripod and the rollers and providing in the free inner edge of the bell recesses the minimum depth of which recesses is calculated in accordance with the amplitude of the aforementioned planetary movement.

5 Claims, 7 Drawing Figures

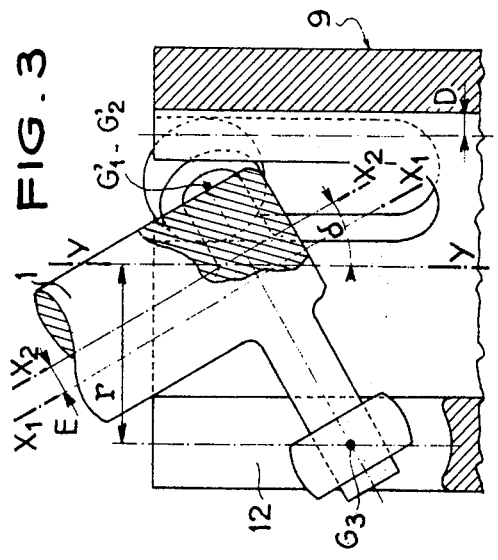
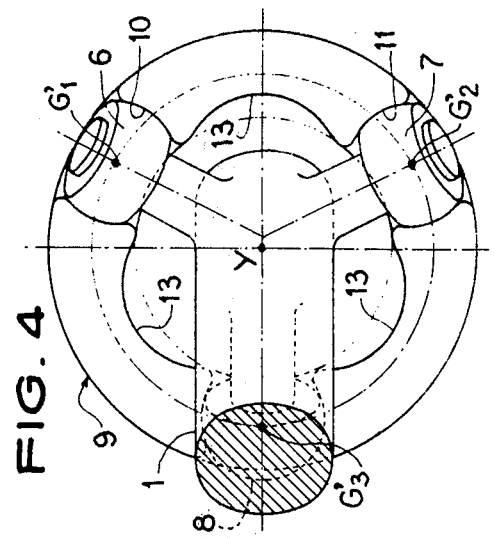
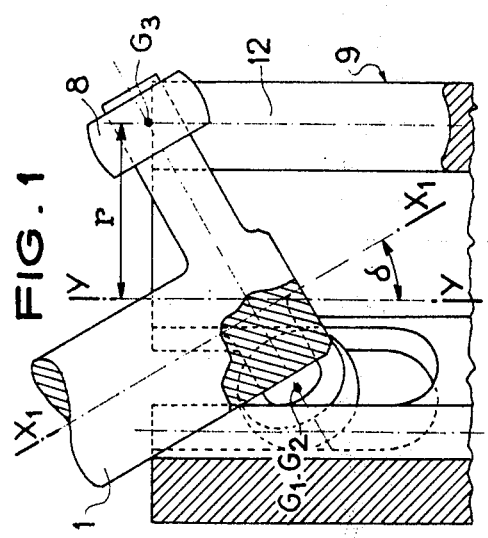
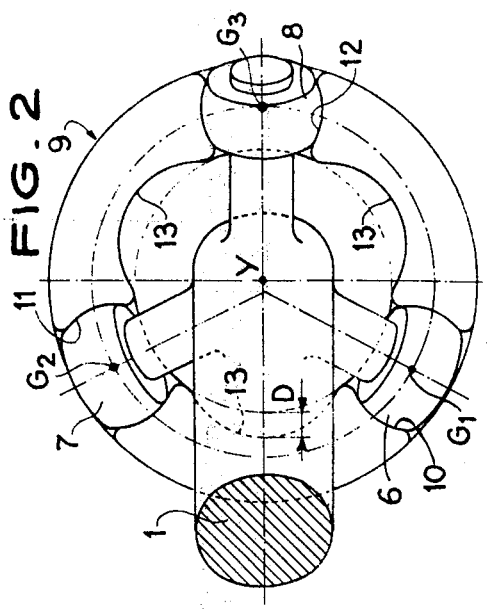

SLIDING HOMOKINETIC JOINT

BACKGROUND OF THE INVENTION

The present invention relates to sliding homokinetic joints employed in particular for the transmission between a motor-drive unit and the front driving wheels of a front-drive vehicle.

In such vehicles, it is known that the transmission shaft must allow the relative movement between the wheels and the suspended part of the vehicle and must therefore be able to absorb an angular alignment defect and modifications of the distance between the motor-drive unit and the wheels during the transmission of the torque. This application and other applications therefore require a wide angle of breaking of the joints and a sliding capacity. A first arrangement employs an axially fixed joint having a large breaking capacity or a large angularity, the sliding being then ensured separately by a splined connection. The angular movement and sliding functions are theoretically possible, but it may be observed that the splines slide with difficulty under torque and that the axial reactions transmitted to the motor and to the bearing of the wheels result in various drawbacks such as: the transmission of vibrations of the motor to the wheel hub and to the structure or the body of the vehicle; fatigue in the bearings of the wheel hub and of the output member of the differential; a relatively high cost due to the fact that each one of the two functions is ensured by separate means.

A second arrangement employs a sliding homokinetic joint of the tripod type which performs on the whole very well and simultaneously, the two functions of transmission of torque at an angle and sliding. The devices of this type, described for example in French Patent No. 1,272,530 filed July 4, 1960 by the Applicant, usually comprise a first element or tripod integral with one of the shafts to be coupled and carrying two rollers, and a second element or bell integral with the other shaft to be coupled and having the general shape of a cylindrical ring in which there are formed three raceways which have a circular cross section and in which the rollers carried by the tripod are received. It has been observed that when such a joint operates at an angle, the axis of the shaft integral with the tripod effects, upon rotation, a planetary movement around a mean position so that the maximum breaking angle—which corresponds to a limit position for which one of the rollers is at the end of its raceway, whereas the tripod shaft comes roughly in contact with the free inner edge of the bell—is determined by the most unfavourable position of the shaft integral with the tripod with respect to said bell, corresponding to one of the two extreme positions of the shaft in the course of its planetary movement. As the usual shape of the inner wall of the bell is that of a bore of circular section, it will be understood that the maximum break angle is less, everything else being equal, than the maximum break angle that would be possible with a homokinetic joint in which the shaft integral with the tripod does not undergo a planetary movement.

SUMMARY OF THE INVENTION

An object of the present invention is to increase the maximum break angle of a sliding homokinetic joint of the tripod type so as to resolve in an economical and effective manner the problem of applications requiring a very free sliding and a large breaking angle of the joint.

According to the invention, there is provided a sliding homokinetic joint comprising a first element or tripod integral with one of the two shafts to be coupled and carrying three rollers and a second element or bell integral with the other shaft to be coupled and having the general shape of a cylindrical ring in which there are formed three raceways which have a circular cross-sectional shape and in which raceways the rollers carried by the tripod are received, wherein the bell comprises, at least in the vicinity of its inner free edge, a recess or cavity having a depth which, in the region located at equal distance between two adjacent raceways, is, preferably, at least equal to $E/\cos \sigma$, wherein $E$ is the distance between the two extreme positions of the axis of the shaft integral with the tripod in the course of its planetary movement and $\sigma$ is the maximum break angle of the joint.

According to other features:

the recess or cavity has a substantially sinusoidal profile;

the recess is formed on a notable part of the length of the bell whose inner wall therefore retains a shape which is cylindrical but has a non-circular cross section;

the recess is constituted by a chamfer provided along the inner free edge of the bell.

It is, moreover, essential that, in the region of the raceways, the thickness of the bell be substantially unchanged with respect to a joint which does not have the features of the invention, the recess being progressive from the edge of each one of these raceways.

BRIEF DESCRIPTION OF THE DRAWINGS

The invention will be understood better from the ensuing description with reference to the accompanying drawings and in which:

FIGS. 1–4 are diagrammatic views which serve to explain the improvement according to the invention;

DETAILED DESCRIPTION OF THE INVENTION

Figure 6:
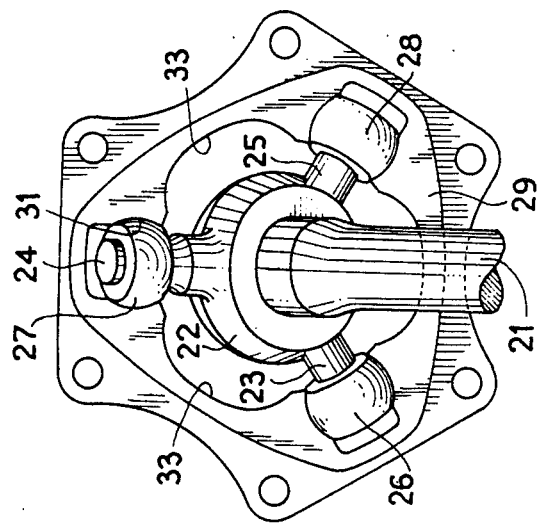
FIG. 6 is an end elevational view of the joint shown in FIG. 5.

FIGS. 1–4 show a homokinetic joint for coupling two shafts, namely a first shaft 1 which is integral with a tripod 2 and has three trunnions or pivots 3, 4, 5 disposed at 120° and carrying rollers 6, 7, 8 respectively.

The second shaft (not shown) is integral with a bell 9 in the shape of a cylindrical ring in which are formed three raceways 10, 11, 12 which have a circular cross-sectional shape and are each defined by two confronting recesses. Each of the rollers is received in one of the raceways thus defined. In the illustrated embodiment, the joint is assumed to be operating at an angle which is the maximum break angle that is to say the maximum angular deviation between the two shafts. The two axes $X_1-X_1$ and $Y-Y$ of the two shafts therefore make therebetween an angle $\sigma$, the centres G1, G2, G3 of the three rollers being disposed in such manner that in the position shown in FIGS. 1 and 2, the point G3 is located at the end of the associated raceway 12 whereas in the position shown in FIGS. 3 and 4, the joint is assumed to have turned through 180°, the roller 8 then occupying the opposite extreme position shown at G3. The axis of the shaft 1 then has the position $X_2$-$X_2$.

According to the invention, the bell 9 comprises three recesses 13 (the shape of which is seen best in FIGS. 2 and 4) which permit the shaft to occupy the illustrated position of maximum break angle.

It can be seen clearly from this drawing that the distance E between the two extreme positions $X_1$-$X_1$, $X_2$-$X_2$ of the axis of the shaft 1, resulting from the planetary motion of the latter in the course of the rotation of the joint, determines the minimum depth that the recesses 13 provided inside the bell must have to allow the maximum break angle of the illustrated joint. Without going into the details of the calculations which have to be made, it will merely be mentioned that if j designates the radial displacement of the shaft with respect to the position it occupies in FIG. 1, this displacement j is defined by the formula:

$$j = \frac{r}{2}\left(\frac{1}{\cos \delta} - 1\right)\cos 3\phi$$

wherein:

r is the distance between the axis Y-Y of the bell and the axes of the raceways.
$\sigma$ is the break angle of the joint;
$\phi$ is the angle of rotation of the joint with respect to the position shown in FIG. 1.

The value of E, which is the algebraic difference between the values of j for $\phi = 0$ and $\phi = \pi$, is then $$E = I\left(\frac{1}{\cos \delta} - 1\right).$$

Bearing in mind the break angle of the joint, this value of E gives the minimum depth D which the recess 13 must have when the joint is in the unfavorable position shown in FIG. 1 in which the shaft 1 is the nearest to the bell in its planetary motion. This minimum depth is equal to $$D = \frac{E}{\cos \delta}.$$

It can be seen that the depth of the recess 13 does not have to be constant throughout the regions of the two adjacent raceways, bearing in mind that, in the course of its planetary motion, the shaft, while forming the same break angle, is more or less remote from the adjacent edge of the bell. Consequently, if the minimum depth of these recesses at equal distance from two adjacent raceways is defined by the aforementioned formula, the general profile of these recesses may be chosen as desired in accordance with machining facilities, while however satisfying for each position the condition which defines the distance between the nearest generatrix of the shaft 1 and the adjacent edge of the bell. Thus this profile may be substantially sinusoidal or have the shape shown in FIG. 6 for example.

It will also be observed that, owing to the feature of the invention, the break angle of a joint may be substantially increased, everything else being equal. Thus, if the maximum angularity of a slidable tripod joint is $X°$, the incorporation of the feature according to the invention enables this angle to be increased to 40° with a gain of 7°, namely about 20%, while retaining the same overall size and the same sturdiness.

It will also be observed that the feature according to the invention is of all the more interest as the ratio between the diameter of the rollers and the base radius r is smaller, and, for example, of the order of about 0.6.

Figure 5:
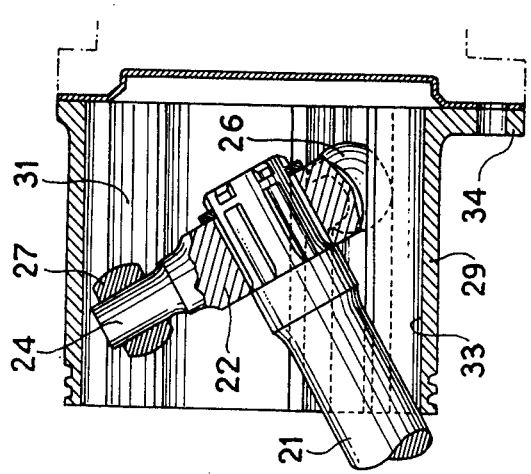
FIG. 5 is a longitudinal sectional view of a first embodiment of a joint according to the invention.

In the embodiment shown in FIGS. 5 and 6 in which elements corresponding to those shown in FIGS. 1–4 are designated by the same references increased by 20, the recesses 33 provided in the bell 29 extend throughout the length of the latter which facilitates machining operations, in particular when the latter include milling operations. The bell has then an outer surface in the shape of a curvilinear triangle (FIG. 6) and an inner surface constituted by three lobes defining the recesses according to the invention. In such a case, the bell is fixed by a flange 34 which is integral therewith and fixed to a corresponding flange provided at the end of the second shaft.

Figure 7:
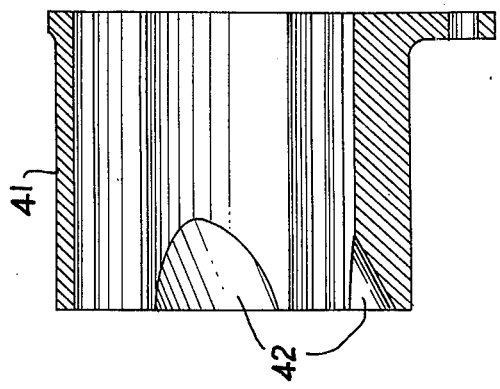
FIG. 7 is a longitudinal sectional view of another embodiment of a bell in a joint according to the invention.

In the embodiment shown in FIG. 7, the recesses of the bell are constituted simply by chamfers 42, the slope and depth of which are such that they satisfy the various conditions indicated hereinbefore and therefore allow the same gain to be achieved as in the preceding embodiment as concerns the increase in the break angle. This embodiment results in a saving of material but results in greater difficulties as concerns machining.

Other shapes can of course be envisaged for the recesses formed in the bell without departing from the scope of the invention.

It must also be understood that these recesses may be shallower than indicated in the drawings, the resulting gain being then less than optimal.

Having now described my invention what I claim as new and desire to secure by Letters Patent is:

1. In a sliding homokinetic joint comprising a first element rotatable about an axis and integral with one of two shafts to be coupled and having a shaft portion and three trunnions extending from the shaft portion, three rollers respectively rotatably mounted on the trunnions and a second element which is rotatable about an axis and is integral with the other of said shafts to be coupled and has the general shape of a cylindrical ring having an end portion which is remote from said other shaft and defines a radially inner edge and having portions which define three raceways which have a particular cross-sectional shape and in which raceways the three rollers are respectively rollingly engaged; the improvement comprising three recesses which are provided in the second element at least in the region of said inner edge and partly define said inner edge and are interposed between the raceways for clearing said shaft portion of the first element, each recess terminating peripherally of the second element short of said portions defining the three raceways and having a depth radially of the second element which, in a region of the recess located half-way between two adjacent raceways is at least equal to E/cos $\sigma$, wherein E is the distance between the two extreme positions of the axis of the first element in the course of the planetary motion of the first element in joint operation and $\sigma$ is the maximum break angle of the joint.

2. A joint as claimed in claim 1, wherein the recess has a substantially sinusoidal cross-sectional shape.

3. A joint as claimed in claim 1, wherein the recess is formed on a notable part of the axial extent of the second element.

4. A joint as claimed in claim 1, wherein the recess is constituted by a chamfer having an extent axially of the second element which is less than the axial extent of the second element.

5. In a sliding homokinetic joint comprising a first element rotatable about an axis and integral with one of two shafts to be coupled and having a shaft portion and three trunnions extending from the shaft portion, three rollers respectively rotatably mounted on the trunnions and a second element which is rotatable about an axis and is integral with the other of said shafts to be coupled and has the general shape of a cylindrical ring having an end portion which is remote from said other shaft and defines a radially inner edge and having portions which define three raceways which have a part-circular cross-sectional shape and in which raceways the three rollers are respectively rollingly engaged; the improvement comprising three recesses which are provided in the second element at least in the region of said inner edge and partly define said inner edge and are interposed between the raceways for clearing said shaft portion of the first element, each recess having a depth relative to an imaginary cylinder tangent to said portions defining the raceways which, in a region of the recess located half-way between two adjacent raceways, is at least equal to $E/\cos \sigma$, wherein E is the distance between the two extreme positions of the axis of the first element in the course of the planetary motion of the first element in joint operation and $\sigma$ is the maximum break angle of the joint, and each recess progressively decreasing in depth relative to said cylinder in a direction circumferentially of said cylinder substantially throughout the extent of the recess from said region of the recess to said portions defining the raceways.

* * * * *